(12) United States Patent
Squillace et al.

(10) Patent No.: US 11,913,757 B2
(45) Date of Patent: Feb. 27, 2024

(54) CONSTRAINING NAVIGATIONAL DRIFT IN A MUNITION

(71) Applicant: Rosemount Aerospace Inc., Burnsville, MN (US)

(72) Inventors: Guy Squillace, Prior Lake, MN (US); Gary Willenbring, Waconia, MN (US); Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 214 days.

(21) Appl. No.: 17/578,006

(22) Filed: Jan. 18, 2022

(65) Prior Publication Data
US 2023/0228529 A1 Jul. 20, 2023

(51) Int. Cl.
*F41G 7/36* (2006.01)
*F41G 7/22* (2006.01)

(52) U.S. Cl.
CPC .............. *F41G 7/36* (2013.01); *F41G 7/2253* (2013.01)

(58) Field of Classification Search
CPC .................................. F41G 7/36; F41G 7/2253
See application file for complete search history.

(56) References Cited

U.S. PATENT DOCUMENTS

| | | | | |
|---|---|---|---|---|
| 4,234,142 A | * | 11/1980 | Yost | F41G 7/20 244/3.21 |
| 4,589,610 A | * | 5/1986 | Schmidt | F41G 7/22 342/25 R |
| 4,659,035 A | * | 4/1987 | Clendenning | G05D 1/107 244/3.21 |
| 4,840,328 A | * | 6/1989 | Sundermeyer | F41G 7/36 244/3.15 |
| 5,260,709 A | * | 11/1993 | Nowakowski | F41G 7/36 342/357.44 |
| 5,274,314 A | * | 12/1993 | Maqueira | G05B 13/042 318/632 |

(Continued)

*Primary Examiner* — Luis A Martinez Borrero
(74) *Attorney, Agent, or Firm* — Locke Lord LLP; Scott D. Wofsy; Christopher J. Capelli

(57) ABSTRACT

A method and system for constraining navigational drift in a munition caused by Inertial Measurement Unit (IMU) bias error during flight of the munition in a constellation of a plurality of munitions in a Global Positioning System (GPS) denied attack. Each munition is provided with a datalink communication system to communicate with other munitions in the constellation and a navigation system having an IMU for guiding the munition in flight. An estimated position and covariance of the estimated position is determined for each munition via each munitions' navigation system. A range of each munition relative to at least one other munition in the munition constellation is determined via each munitions' datalink communication system. The estimated position and range to at least one other munition in the munition constellation is shared by each munition via each munitions' datalink communication system. Navigational drift for each munition is determined utilizing the estimated position of at least one other munition and the range to that at least one other munition in the munition constellation. And navigational drift in each munition is constrained by compensating for IMU bias error in each munition utilizing the determined navigational drift for each respective munition in the munition constellation.

20 Claims, 5 Drawing Sheets

(56) References Cited

U.S. PATENT DOCUMENTS

| | | | | |
|---|---|---|---|---|
| 5,435,503 | A * | 7/1995 | Johnson, Jr. | F41G 7/2246 701/3 |
| 5,637,826 | A * | 6/1997 | Bessacini | G05D 1/12 114/21.1 |
| 5,762,290 | A * | 6/1998 | Dupont | G05D 1/12 244/3.15 |
| 5,804,812 | A * | 9/1998 | Wicke | F41G 7/306 244/3.1 |
| 5,819,206 | A * | 10/1998 | Horton | G06F 3/011 702/111 |
| 5,828,571 | A * | 10/1998 | Bessacini | G01S 15/66 701/1 |
| 5,943,009 | A * | 8/1999 | Abbott | F41G 7/36 342/357.44 |
| 6,006,145 | A * | 12/1999 | Bessacini | G01S 13/723 701/1 |
| 6,125,308 | A * | 9/2000 | Hills | F41G 3/142 701/1 |
| 6,186,441 | B1 * | 2/2001 | Schneidereit | F41G 3/142 244/3.13 |
| 6,259,974 | B1 * | 7/2001 | Bessacini | F41G 7/008 701/1 |
| 6,380,526 | B1 * | 4/2002 | Kau | G01C 21/16 701/13 |
| 6,456,906 | B1 * | 9/2002 | Hua | G05D 1/107 701/13 |
| 6,573,486 | B1 * | 6/2003 | Ratkovic | F41G 7/36 244/3.2 |
| 6,666,410 | B2 * | 12/2003 | Boelitz | B64G 1/002 244/171.1 |
| 6,726,146 | B2 * | 4/2004 | Li | F42B 15/01 342/63 |
| 6,808,139 | B1 * | 10/2004 | Sturm | F41G 7/301 244/3.13 |
| 7,032,857 | B2 * | 4/2006 | Hua | G05D 1/107 244/3.17 |
| 7,233,859 | B2 * | 6/2007 | Lundberg | G01C 21/20 701/1 |
| 7,280,917 | B2 * | 10/2007 | Hager | G01P 13/025 244/164 |
| 7,286,624 | B2 | 10/2007 | Woo et al. | |
| 7,394,046 | B2 * | 7/2008 | Olsson | G01S 11/04 342/63 |
| 7,566,026 | B2 * | 7/2009 | Lam | F41G 3/142 244/3.1 |
| 7,675,011 | B2 * | 3/2010 | Jonson | F41G 7/22 102/475 |
| 7,839,916 | B1 * | 11/2010 | Luecke | G01S 19/31 375/147 |
| 7,920,943 | B2 * | 4/2011 | Campbell | G05D 1/0676 701/16 |
| 7,947,936 | B1 * | 5/2011 | Bobinchak | F41G 3/04 701/1 |
| 8,165,795 | B2 * | 4/2012 | Debailleul | G01C 25/00 244/3.2 |
| 8,212,195 | B2 * | 7/2012 | Geswender | F42B 10/62 701/4 |
| 8,296,053 | B1 * | 10/2012 | Brennan | F42B 15/01 244/3.28 |
| 8,424,808 | B2 * | 4/2013 | Boelitz | B64G 1/002 244/158.9 |
| 8,436,283 | B1 * | 5/2013 | Tournes | F41G 7/22 701/4 |
| 8,525,088 | B1 * | 9/2013 | Ell | F41G 7/2293 244/3.17 |
| 8,669,505 | B2 * | 3/2014 | Guibout | F41G 7/36 701/400 |
| 8,729,442 | B2 * | 5/2014 | Boelitz | G05D 1/105 244/171.1 |
| 8,729,443 | B2 * | 5/2014 | Facciano | B64G 1/002 701/4 |
| 8,957,355 | B1 * | 2/2015 | Truncale | F42B 15/01 439/55 |
| 9,115,968 | B1 * | 8/2015 | Abruzzo | F42B 30/006 |
| 9,121,680 | B2 * | 9/2015 | Morgan | F42B 10/64 |
| 10,012,477 | B1 * | 7/2018 | Ell | F41G 7/2253 |
| 10,114,384 | B2 | 10/2018 | Liu et al. | |
| 10,337,835 | B2 | 7/2019 | Smith | |
| 10,527,427 | B1 * | 1/2020 | Jankowski | F42B 15/01 |
| 10,557,686 | B2 * | 2/2020 | Rowlands | F41G 5/14 |
| 10,641,582 | B1 * | 5/2020 | Peterson | F41G 7/308 |
| 10,859,346 | B2 * | 12/2020 | Townsend | F41G 3/22 |
| 10,894,603 | B2 * | 1/2021 | Lebaron | F41H 13/0025 |
| 11,199,380 | B1 * | 12/2021 | Ekhaus | F41G 7/226 |
| 11,498,679 | B2 * | 11/2022 | Gooch | F41H 13/0006 |
| 11,509,828 | B1 * | 11/2022 | Jankowski | F42B 10/06 |
| 11,555,679 | B1 * | 1/2023 | McLoughlin | F42B 10/64 |
| 11,573,069 | B1 * | 2/2023 | Parrow | F42B 10/64 |
| 11,578,956 | B1 * | 2/2023 | Cheung | F42B 10/14 |
| 11,585,660 | B1 * | 2/2023 | Opperman | G01C 25/005 |
| 11,597,517 | B2 * | 3/2023 | Gooch | F41H 13/0006 |
| 2006/0074558 | A1 * | 4/2006 | Williamson | G01S 19/15 342/357.56 |
| 2008/0265097 | A1 * | 10/2008 | Stecko | G01C 21/188 701/472 |
| 2017/0328683 | A1 * | 11/2017 | Smith | G01S 5/0072 |
| 2018/0209764 | A1 * | 7/2018 | Ginsberg | F41G 7/226 |
| 2018/0279913 | A1 * | 10/2018 | Frasier | A61B 34/20 |
| 2018/0340779 | A1 * | 11/2018 | Faulkner | G01C 21/188 |
| 2020/0080819 | A1 * | 3/2020 | Vasile | F41G 7/226 |
| 2020/0400412 | A1 * | 12/2020 | Zemany | F41G 7/2253 |
| 2021/0033400 | A1 * | 2/2021 | Belenkii | G02B 23/04 |
| 2021/0063160 | A1 * | 3/2021 | Lam | G01C 21/165 |
| 2022/0065588 | A1 * | 3/2022 | Willenbring | F42B 15/01 |
| 2022/0107160 | A1 * | 4/2022 | Cerasuolo | G05D 1/0005 |
| 2023/0228528 | A1 * | 7/2023 | Squillace | F41G 7/226 244/3.15 |
| 2023/0229175 | A1 * | 7/2023 | Squillace | F41G 7/2206 244/3.15 |

* cited by examiner

CONSTRAINING NAVIGATIONAL DRIFT IN A MUNITION

BACKGROUND

1. Field

The disclosed embodiments generally relates to munitions, and more particularly, to constraining navigational drift due to error bias of a munition Inertial Measurement Unit (IMU).

2. Description of Related Art

A munition in a munition salvo can be equipped with a datalink such that munitions in the salvo can communicate with one another to coordinate an attack. Munitions are typically guided from their launch points, typically using a Global Positioning Satellite (GPS) system and an Inertial Measurement Unit (IMU) to: reach the seeker basket; determine a common reference frame; and coordinate target selection. However, in a GPS denied environment (e.g., due to jamming, spoofing and the like) munitions often have to rely on their IMU for guidance. However, biases in the IMU measurements often cause the navigation solution of the munition to drift over time. If the navigation solution drifts too far, the munition may not reach the seeker basket or coordinate target selection.

For instance, and with reference to FIG. 1, when a salvo 10 of munitions 12-20 engages an array of ground targets 22-28, the munition salvo 10 may be used in a coordinated attack of the targets 22-28. The munitions 12-20 are typically maneuverable and autonomous in flight. The munitions 12-20 directly communicate with one another using a datalink system to determine which targets 22-28 to engage to maximize damage and minimize overkill. To achieve this, it is highly desirable for the munitions 12-20 to reach the seeker basket 30 to locate the targets 22-28. As one of ordinary skill readily understands, the seeker basket 30 is the region where a munition 12-20 can detect targets 22-28 given a field of view 32-40 and detection range "A" of a seeker component provided on each munition 12-20. When a munition has to solely rely on its IMU for flight navigation (e.g., in a GPS denied environment), biases in the acceleration and rotation rate measurements from the IMU often cause the navigation solution to drift over time. If the navigation solution drifts too far, a munition 20 may not reach the seeker basket 30 and will be unable to engage a target 22-28.

Thus, it is to be appreciated that once a munition 12 is located in the seeker basket the munition 12 needs to determine a common reference frame and determine which target detections 22-28 it has in common with the other munitions 14-18 also located in the seeker basket 30. Hence, if the navigation solution is not accurate, the munitions 12-18 will be unable to determine corresponding targets or targets will be matched incorrectly. This could lead to overkill of a target or high priority targets not being engaged. Overkill and misses necessitate additional munitions to be used to eliminate the threat. This increases the overall cost to destroy a target, limits the number of targets that can be destroyed, and increases the chance of a counterattack.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the exemplary illustrated embodiments described herein, each munition round a munition constellation is equipped with Two-Way Timing and Ranging (TWTR) algorithms for estimating the range between munitions and synchronize the onboard clock of each munition, via datalink communication between the munitions. Each munition is operable to estimate its position and the covariance of its position estimate. A munition then shares its position estimate and range to other munitions in the constellation. These range measurements are utilized by the munitions to constrain drift in the position estimate of a munition relative to the constellation and provide observability into IMU biases caused by a munitions' IMU. In one exemplary embodiment, this technique is applied to the munitions individually whereby the munition determines its range to only other munitions in the constellation, or in accordance with another exemplary embodiment this technique is applied to all munitions in the constellation where all the ranges between all the munitions are shared.

To achieve these and other advantages and in accordance with the purpose of the illustrated embodiments, in one aspect, a method and system for constraining navigational drift in a munition caused by Inertial Measurement Unit (IMU) bias error during flight of the munition in a constellation of a plurality of munitions in a Global Positioning System (GPS) denied attack is described in which each munition is provided with a datalink communication system to communicate with other munitions in the constellation and a navigation system having an IMU for guiding the munition in flight. An estimated position and covariance of the estimated position is determined for each munition via each munitions' navigation system. A range of each munition relative to at least one other munition in the munition constellation is determined via each munitions' datalink communication system. The estimated position and range to at least one other munition in the munition constellation is shared by each munition via each munitions' datalink communication system. Navigational drift for each munition is determined utilizing the estimated position of at least one other munition and the range to that at least one other munition in the munition constellation. And navigational drift in each munition is constrained by compensating for IMU bias error in each munition utilizing the determined navigational drift for each respective munition in the munition constellation.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Aspects of the disclosed embodiments are illustrated in the following description and related drawings directed to specific illustrated embodiments. Alternate embodiments may be devised without departing from the scope of the illustrated. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

The terminology used herein is for the purpose of describing particular embodiments only and is not intended to be limiting of the illustrated embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 2:
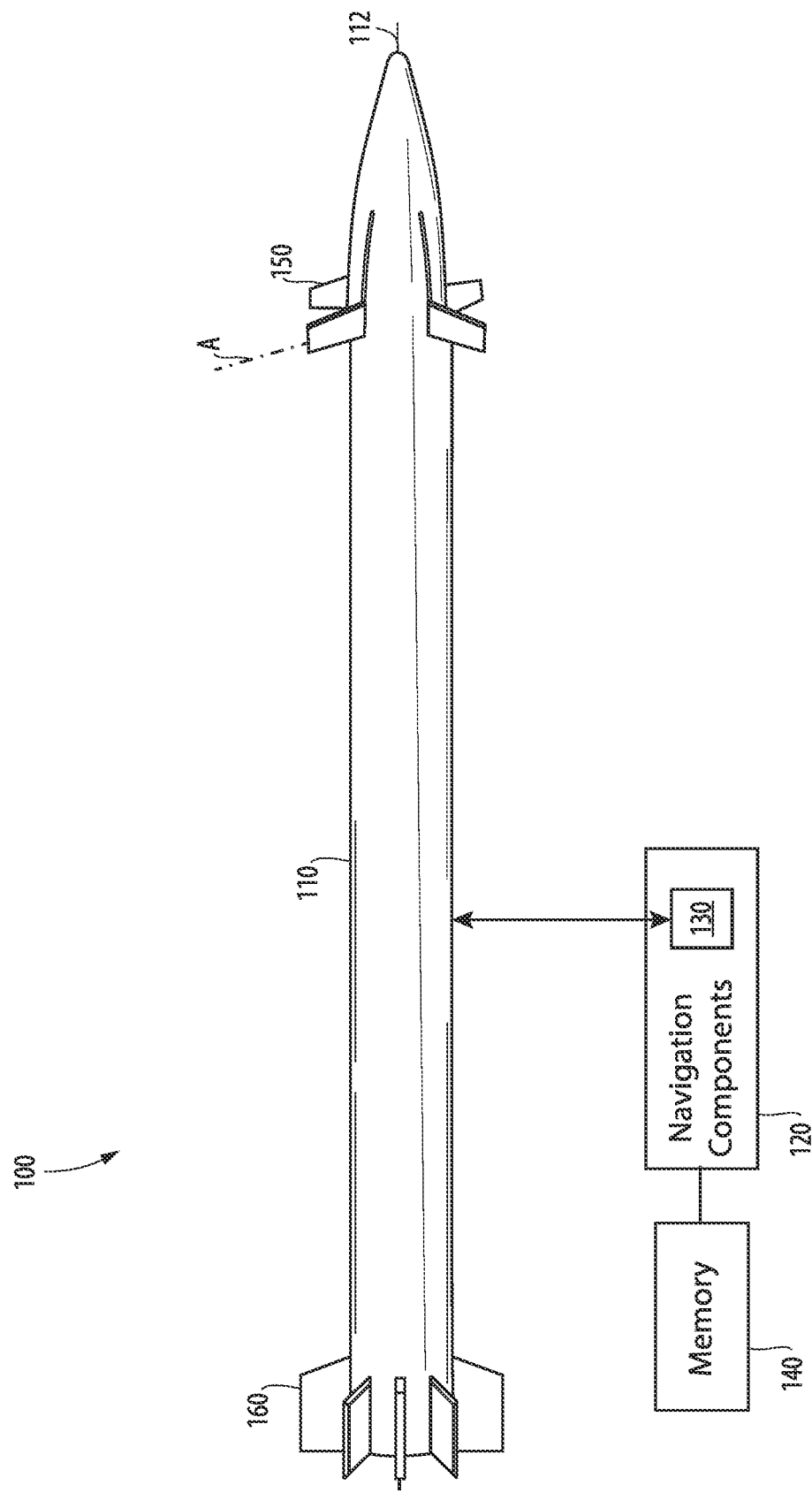
FIG. 2 illustrates schematic illustration of a munition projectile.

With reference now to FIG. 2, shown is an exemplary embodiment of a munition 100 that is a suitable exemplary environment in which certain embodiments of the below described illustrated embodiments may be implemented. FIG. 2 is an example of a suitable environment and is not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added. For instance, the munition 100 shown in FIG. 2 is depicted as a projectile 110 (as described below). However, a munition of the illustrated embodiments described herein is not to be understood to be limited to such as projectile shown as it may encompass any suitable munition including, but not limited to: gun launched munitions; rocket propelled munitions; motor propelled munitions; air dropped munitions and Unmanned Aerial Vehicles. It is to thus be appreciated for ease of illustration, munition 100 is shown and described as a projectile 110 in FIG. 2.

As shown in FIG. 2, a munition 100 includes a navigation system 120 having at least one associated processor 130 operatively connected to a memory 140. Certain components of the navigation system 120 are described further below with reference to FIG. 3. It is to be appreciated and understood, the projectile 110 of FIG. 2 is configured and adapted to undertake the operations described below. For instance the projectile 110 may include a plurality of control surfaces 150, e.g. all-moving fins and fixed lifting surfaces with hinged control surfaces, configured to rotate about their respective deflection axes A to generate control forces and moments. Projectile 110 may also include a plurality of tail fins 160.

Those skilled in the art will readily appreciate that navigation system 120 is disposed within projectile 110. Those skilled in the art will also readily appreciate that processor 130 may be any one of numerous known processors or an application specific processor that operates in response to program instructions. Processor 130 can comprise more than one distinct processing device, for example to handle different functions, e.g. different operations of the method described below. It is also contemplated that memory 140 can be any form of memory device, for example, volatile or non-volatile memory, solid state storage device, magnetic device, or the like. It will be appreciated that memory 140 may include either, or both, RAM (random access memory) and ROM (read only memory). It will be further appreciated that memory 140 could be integrally formed as part of processor 130.

Figure 3:
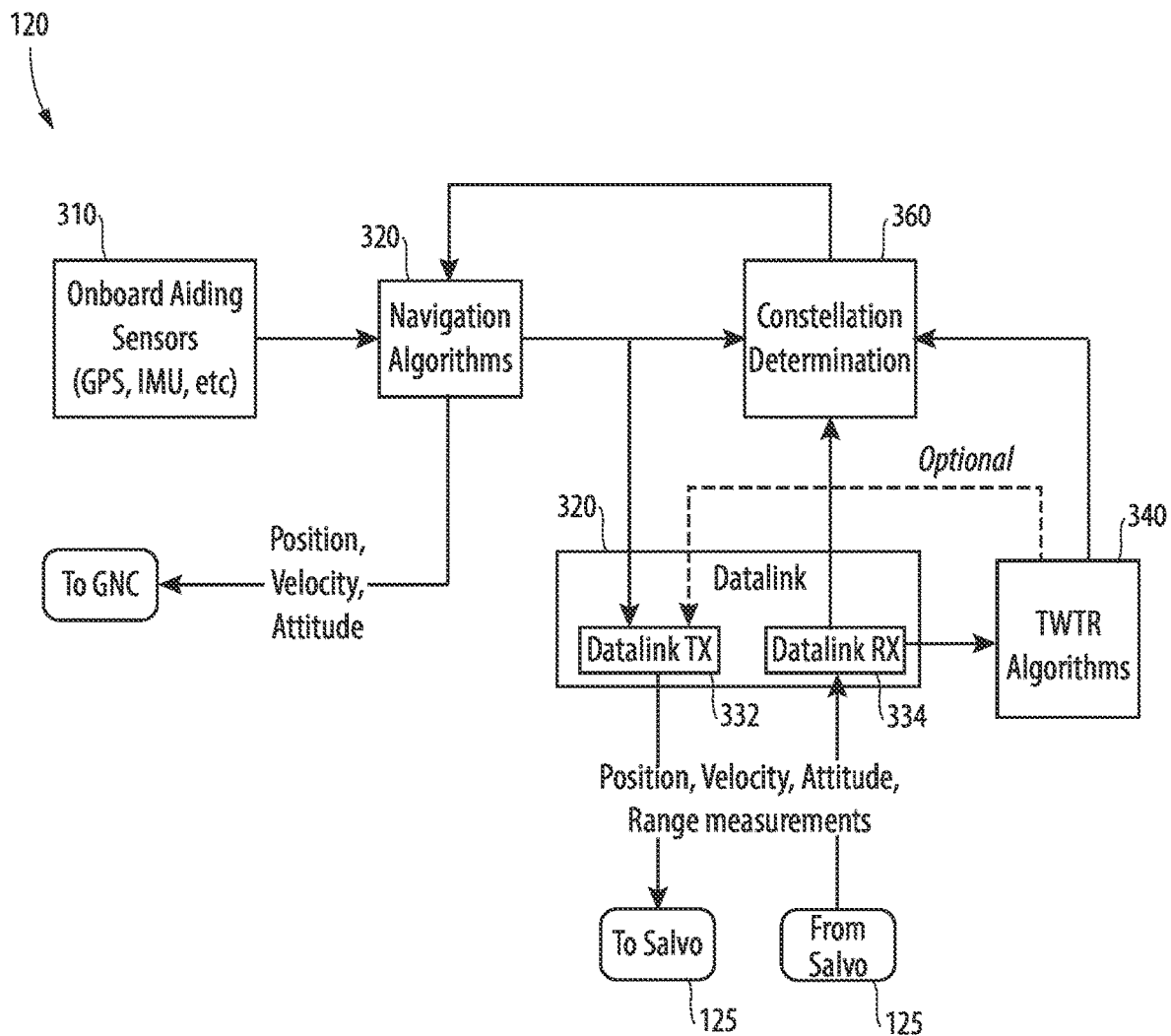
FIG. 3 illustrates schematic illustration of a navigation system utilized in the munition projectile of FIG. 2 in accordance with the illustrated embodiments.

In accordance with the certain illustrated embodiments, and with reference now to FIG. 3, the navigation system 120 of munition 100 (FIG. 2) may include and/or be communicatively coupled to the components/software modules shown in FIG. 3, as now briefly described. Navigation system 120 includes onboard aiding sensors 310 for determining positioning of the munition 100 while in flight. In accordance with the illustrated embodiments, onboard aiding sensors include one or more Inertial Measurement Units (IMU). As readily understood by one of ordinary skill in the art, IMUs have been used in a wide variety of applications. For example, IMUs are commonly used in inertial guidance and navigation systems for all types of vehicles, in particular aircraft and spacecraft. Inertial navigation has the advantage of not being dependent on an external point of reference (e.g., GPS). Navigation is accomplished by sensing the motion of the munition 100 and calculating the change in position with respect to an initial position. The IMU is able to determine the three-dimensional orientation of a projectile 110 relative to a reference direction absolutely within an inertial system.

A typical IMU may consist of three equal modules, each including a gyroscopic rotational rate sensor, a linear accelerometer, and associated electronics. Each module is typically oriented on a cube or a similar structure to provide inertial measurements along one of three orthogonal axes, with the gyroscopic rotational rate sensors providing information regarding rotation of the unit and the accelerometers providing information concerning linear movement of the unit. In this way, the IMU is able to determine the position of the vehicle with respect to the vehicle's initial position to aid in guidance, navigation, and control of the vehicle.

Three-axis inertial measurement units as described above have been used extensively in aerospace applications. Traditionally, such IMUs included mechanical sensors such as conventional spinning mass gyroscopes and large mechanical accelerometers. However, most current IMUs utilize microelectromechanical systems (MEMS) devices. Many MEMS sensors are mounted on a support substrate made of silicon or a similar material and can detect acceleration by measuring a change in capacitance. Current technologies using MEMS devices encapsulate the accelerometer, gyroscope, and associated electronics into individual packages. These packages are typically soldered to a circuit board, which is then mounted on one plane of an orthogonal assembly, such as a face of a cube.

Most inertial sensors, including MEMS sensors, are perpendicular sensors or out of plane devices, meaning that the sense axis of the device is oriented at a 90 degree angle with respect to the mounting plane. Some MEMS devices, including accelerometers and gyroscopes, are in-plane sensors. In-plane sensors are inertial sensors having a sense axis that is parallel to the mounting plane. In-plane sensors detect an acceleration or rotation along an axis parallel to the surface of the support substrate.

Figure 1:
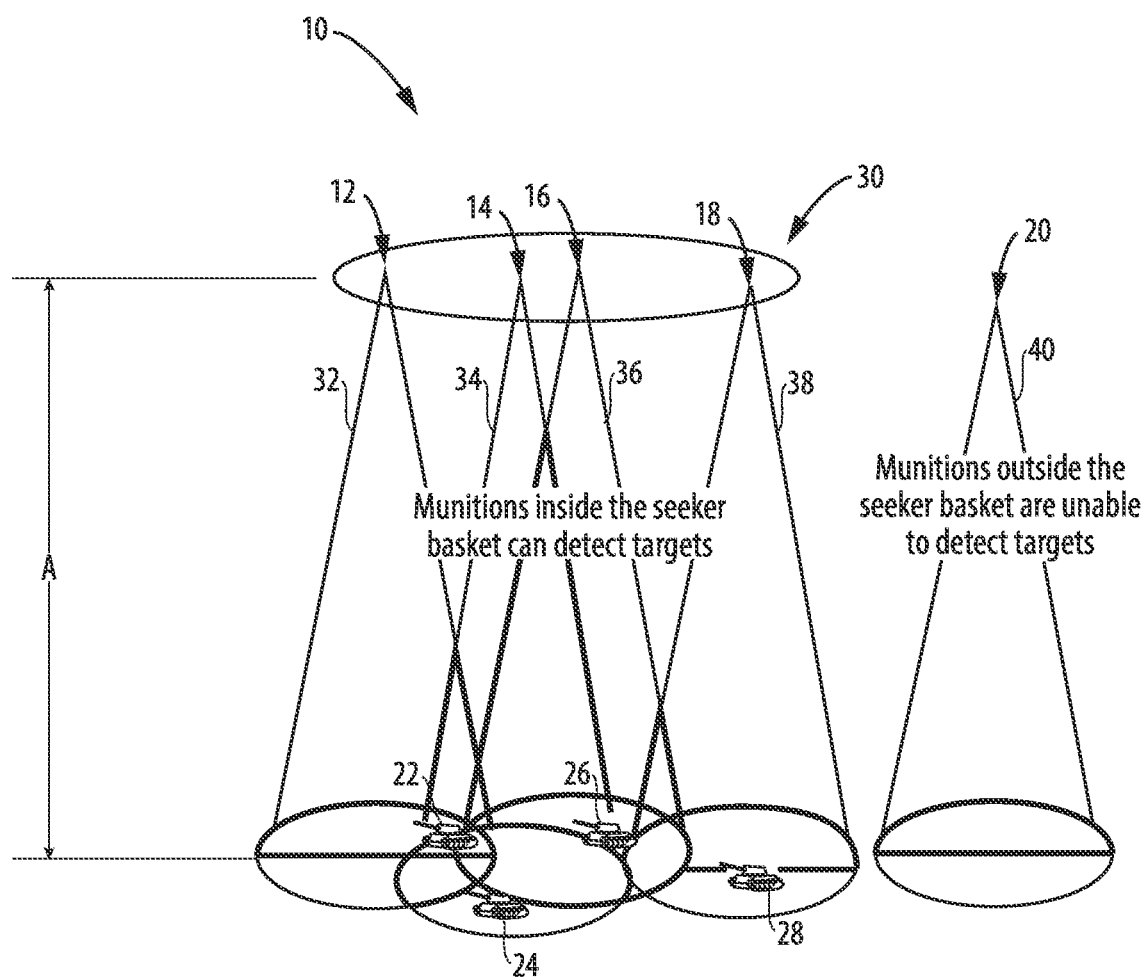
FIG. 1 illustrates a schematic illustration of a munition constellation engaging targets.

It is to be appreciated and understood, and as know to one of ordinary skill in the art, the munition 100 further includes a seeker component (e.g., typically affixed to the nose portion 112 of a projectile 110) for recognizing a ground target (e.g., 22-28 of FIG. 1). The navigation system 120 of the munition 100 is also preloaded with a flight plan to a predetermined target seeker basket (e.g., 30 of FIG. 1) and/or to ground target (e.g., 22-28 of FIG. 1).

As shown in FIG. 3, communicatively coupled to the IMU 310 is a navigation software module 320 configured and operable such that each munition 100 is able to estimate its position, velocity and attitude with covariance estimates using the IMU 310, as well as any other navigation aiding solutions provided on a particular munition type. In accordance with the illustrated embodiments, navigation system 120 is provided with a datalink system 330 having a datalink transmitter 332 and receiver 334 for providing direct two-way communication with other munitions 100 in a munition salvo 125 each also having a compatible datalink system. As described further below, during flight of munitions in a salvo 125, each munition 100 equipped with a datalink system 330 is enabled to communicate in real-time with each other so as to share/communicate navigation data (e.g., position coordinates, velocity, attitude and range measurements) with each other. As also described below, additional shared by the datalink system 330 may be Two-Way Timing and Ranging (TWTR) data as determined by a TWTR software module 340 provided in the navigation system 120. The TWTR software module 340 is operable to estimate ranges between the munition 100 and other munitions within the salvo 125. Thus, in accordance with the illustrated embodiments, and with reference to FIGS. 4A and 4B, it is to be appreciated that each munition 100 is equipped with TWTR algorithms 340 operable to estimate the range between the munitions 410-460 in a constellation 400 (FIGS. 4A and 4B) and synchronize the onboard clock of each munition 410-460 using a datalink 330. The navigation system 120 of each munition 100 is also configured and operable to estimate its position and the covariance of its position estimate using an Extended Kalman Filter (EKF), Unscented Kalman Filter (UKF), or a similar estimation technique.

Navigation system 120 further includes a constellation determination software module 360 which is operable to utilize the munitions navigation data from the IMU 310 and navigation software module 320 in conjunction with determined TWTR data from other munitions in the salvo 125 (via TWTR software module 340) to determine a munition constellation relative to targets and calculate navigation aiding measurements, as described further below. And as also further described below, the sharing of such navigation data amongst munitions 100 in a salvo enables the navigation system 120 of each munition 100 to process the aforesaid shared navigation data in a Guidance, Navigation, and Control (GNC) system component 350 communicatively coupled to the navigation system 120 for guiding the munition 100 to a target seeker basket and/or target.

Figure 4A:
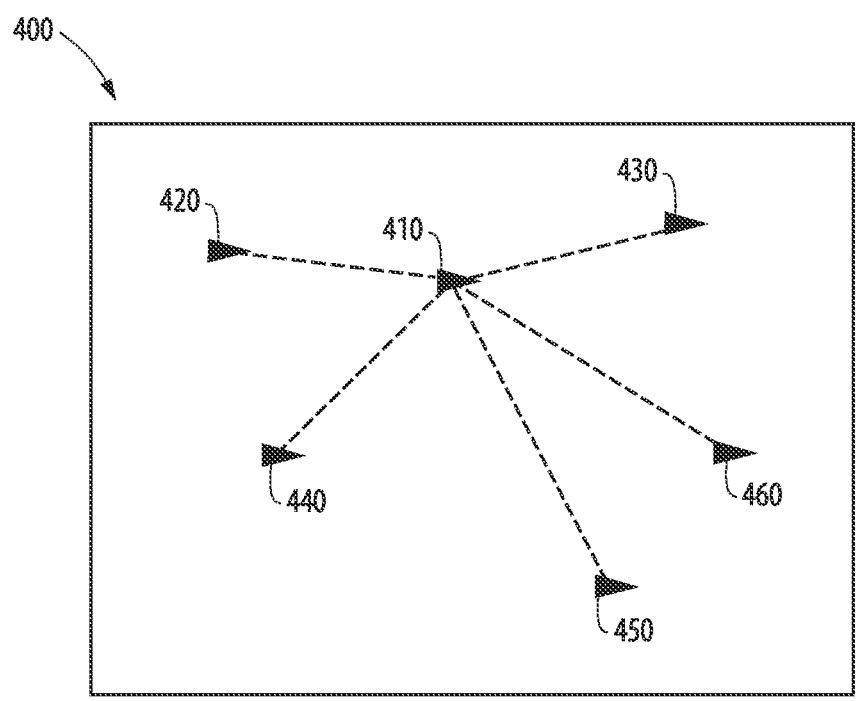
FIGS. 4A and 4B illustrate a munition constellation in accordance with the illustrated embodiments.
Figure 4B:
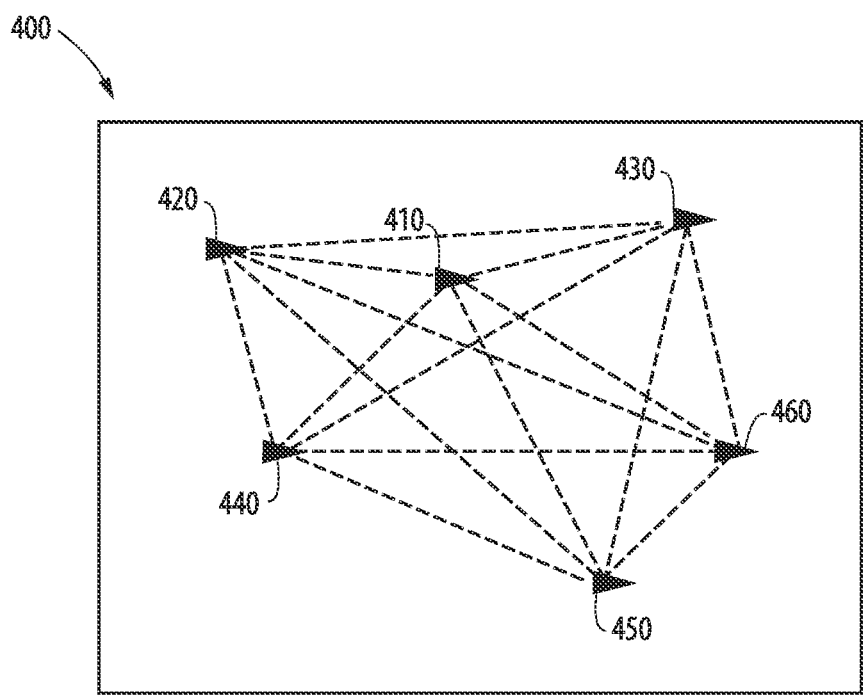

With the exemplary environment of the illustrated embodiments being described above with reference to FIGS. 2 and 3, it is to be appreciated and understood, in accordance with the illustrated embodiments, described is system and method in which each munition 410-460 in a munition salvo 400 intended for one or more targets has its navigation system 120 provided with TWTR algorithms 340 operable and configured to estimate the range between at least one other munition (FIG. 4A) or all other munitions (FIG. 4B) in a salvo 400. The navigation system 120 of each munition 410-460, via its datalink system 330, is also able to synchronize their onboard clocks relative to one. It is to be appreciated that the aforesaid onboard clocks are preferably synchronized such that one munition (e.g., 410) knows when the data received from another munition (e.g., 420) is valid. For instance, the timing system can be UTC time (or similar) or a relative time such as time from munition launch. Synchronizing the times can include determining the difference in a first munition's (e.g., 410) time from launch versus another munition (e.g., 420) time from launch, which enables the first munition (e.g., 410) to resolve the time of validity of a measurement from another munition's (e.g., 420) time. The navigation system 120 of each munition 410-460 is then enabled to estimate its position and the covariance of its position estimate. A munition 410-460, via its datalink system 330, communicates its position estimate and range to at least one other munition 410-460 in the salvo (FIGS. 4A and 4B). As described herein, range measurements between the munitions 410-460 are utilized by the navigation system 120 of each to constrain drift in the position estimate relative to the munition constellation 400 and provide observability into drift bias errors attributable to its IMU 310. As shown in FIG. 4A, this process may be applied to the munitions individually where each munition 410-460 only communicates its range to another munitions 410-460, or with reference to FIG. 4B where the process may be applied to the constellation of munitions 410-460 where all the munitions communicate with each other to share the ranges between all the munitions. Thus, it is to be appreciated and understood that a munition 100 will share its position estimate and its calculations of range to other munitions in a salvo. Knowing the estimated positions of neighboring munitions and the range to them, the navigation system 120 of a munition 100 can aid its own navigation solution by comparing the range based on the estimated position to the measured range from the TWTR algorithm.

As described herein in accordance with the illustrated embodiments, the navigation system 120 of each munition is thus configured and operable to constrain/arrest IMU drift due to biases in different directions or of different magnitudes. By applying the relative ranging information relative to other munitions in a constellation 400, an EKF or like estimation filter can correct the position, velocity and attitude estimates of the munition while estimating the biases in the IMU 310. It is to be appreciated that the amount of drift bias correction will be dependent upon the accuracy of the position estimates of the navigation system 120 of each munition 100, the accuracy of its ranging algorithm 320, and the number of munitions 410-460 in a munition constellation 400.

Figure 5:
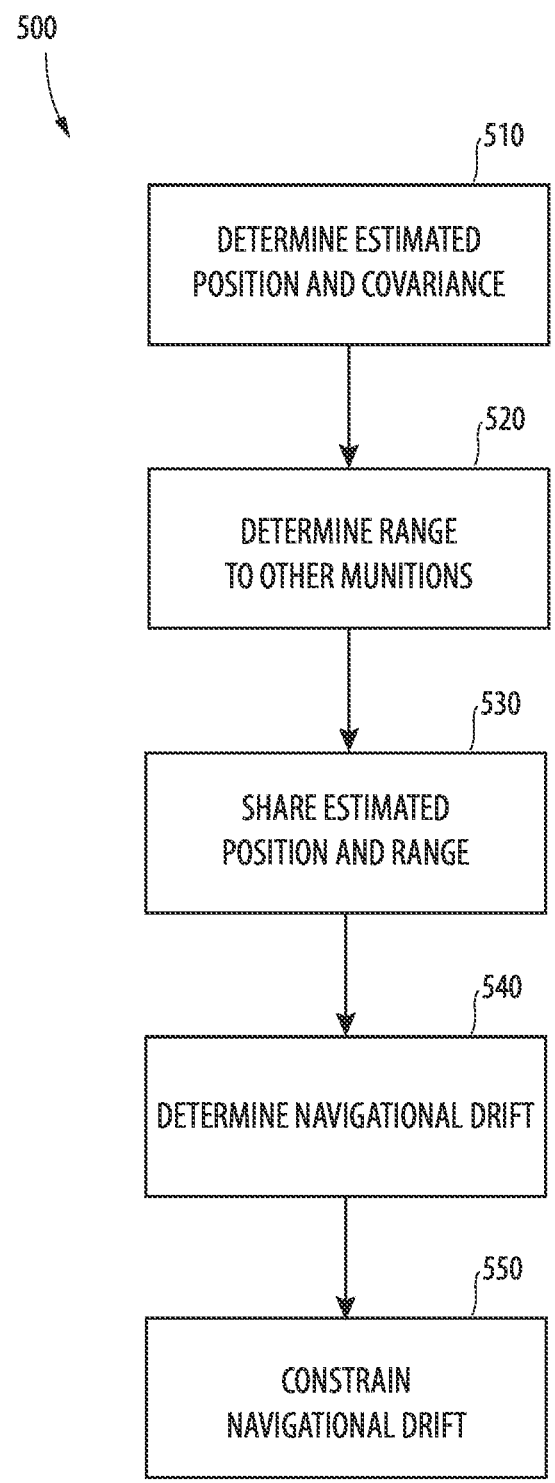
FIG. 5 is flowchart of an exemplary process for constraining drift of a munition in accordance with the illustrated embodiments.

With reference now to FIG. 5, shown is a flow chart demonstrating implementation of the various exemplary illustrated embodiments. It is noted that the order of steps shown in FIG. 5 may not required, so in principle, the various steps may be performed out of the illustrated order. Also certain steps may be skipped, different steps may be added or substituted, or selected steps or groups of steps may be performed in a separate application following the embodiments described herein.

In accordance with the illustrated embodiments, and with reference to the munitions constellations 400 of FIGS. 4A and 4B, FIG. 5 illustrates a process 500 for constraining navigational drift in a munition 410 caused by Inertial Measurement Unit (IMU) bias error during flight of a munition 100 in a constellation 400 of a plurality of munitions 410-460 in a Global Positioning System (GPS) denied attack of a plurality of ground targets. As mentioned above, each munition 410-460 is provided with a datalink communication system 330 to communicate with other munitions 410-460 in the constellation 400 and a navigation system 120 having an IMU 310 for guiding the munition 100 in a GPS denied flight.

Starting at step 510, the navigation system 120 of a munition 100 in flight determines an estimated position and covariance of the estimated position in each munition 410-460 in the munition constellation 400. As mention above, the navigation system 120 of each munition 410-460 uses algorithm executed estimation techniques for determining the estimated position and covariance of the estimated position of a munition 410-460. Exemplary estimation techniques include, but are not limited to an Extended Kalman Filter (EKF) and an Unscented Kalman Filter (UKF). Next, at step 520, utilizing the munitions' datalink communication system 300, each navigation system 120 of each munition 410-460 determines a range of each munition 410-460 relative to at least one other munition 410-460 in the munition constellation 400. As mentioned above, the navigation system 120 of each munition 410-460 utilizes Two-Way Timing and Ranging (TWTR) techniques 340 to determine positioning of each munition 410-460 relative to one another in the constellation 400. It is to be appreciated determining a relative position of each munition 410-460 relative to the other munitions in the constellation 400 via each munitions' datalink communication system 330 includes synchronizing an internal clock of each munition 410-460 relative to at least one other munition 410-460 in the munition constellation 400.

As mentioned above, and with specific reference to FIG. 4A, this technique is applied in one illustrated embodiments to the munitions individually, where each munition 410-460 only determines its range compared to another munition 410-460 in the constellation 400. For instance, munition 440 only determines it range relative to munition 410 in constellation 400. In this embodiment, it is to be appreciated that range measurements are compared to the estimated range to each munition 410-460 and applied to the position estimate of the munition 440. For example, an EKF of a munition would use the position estimates and range measurement in a measurement update to the EKF states.

Conversely, as mentioned above, and with specific reference to FIG. 4B, this technique is applied in another illustrated embodiment to the constellation 400 as a whole. In this scenario, munitions 410-460 share their own positions as well as their range estimates to all other munitions 410-460 in the constellation 400. Knowing the estimated positions of each munition 410-460 and measured ranges between each pair (e.g., munition 410 with each munition 420-460) provides an optimal solution for calculating the estimated position of each munition 410-460 in the constellation 400. The estimated position for each munition 410-460 can then be used directly or applied as a measurement update in the case of a Kalman filter. This approach provides increased accuracy relative to the individual approach of FIG. 4A but is also more complex in processing.

At step 530, the navigation system 120 of each munition 410-460 shares its estimated position and range to at least one other munition 410-460 in the munition constellation 400 via the munitions' datalink communication system 330. With specific regards to the illustrated embodiment of FIG. 4A, the estimated position and range of a munition 410 is shared with individual munitions (e.g., 450) in the constellation. And with specific regards to the other illustrated embodiment of FIG. 4B, the estimated position and range of a munition 410 is shared with each of the plurality of munitions (e.g., 420-460) in the munition constellation 400.

Next at step 540, the navigation system 120 of each munition 410-460 determines navigational drift for each respective munition 410-460 via each munitions' navigation system 120 utilizing the aforesaid estimated position of at least one other munition 410-460 and the range to that at least one other munition 410-460 in the munition constellation 400. Then at step 550, once the navigation system 120 of each munition 410-460 determines its navigational drift (step 540), it then constrains this navigation drift in navigation of the munition 410-460 by compensating for its IMU bias error during flight navigation. Thus, by maintaining reliable ranging to other munitions (e.g., 420-460) in a constellation 400, the navigation estimate gains observability into the drift so as to correct the state estimates of a munition. It is to be appreciated that state estimates refers to the Kalman filter states or navigation states dependent upon how the overall navigation solution is determined (e.g., in some instances the navigation solution is more than just the Kalman filter). In the present instance, state estimates is referred to as position, velocity, and attitude.

Therefore, in accordance with the above description, when a munition navigation solution relies on an IMU (e.g., in a GPS denied environment), it will often drift due to biases in the acceleration and rotation rate measurements of the munition. As described above, the various exemplary illustrated embodiments facilitate in correcting a munition's navigation solution by estimating the biases in the IMU to minimize future drift of the munition.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for constraining navigational drift in a munition caused by Inertial Measurement Unit (IMU) bias error during flight of the munition in a constellation of a plurality of munitions in a Global Positioning System (GPS) denied attack of a plurality of ground targets wherein each munition is provided with a datalink communication system to communicate with other munitions in the constellation and a navigation system having an IMU for guiding the munition in flight, the method comprising:
   determining an estimated position and covariance of the estimated position in each munition in the munition constellation via each munitions' navigation system;
   determining a range of each munition relative to at least one other munition in the munition constellation via each munitions' datalink communication system;
   sharing the estimated position and range to at least one other munition in the munition constellation by each munition via each munitions' datalink communication system;
   determining navigational drift for each munition via each munitions' navigation system utilizing the estimated position of at least one other munition and the range to that at least one other munition in the munition constellation; and
   constraining navigational drift in each munition by compensating for IMU bias error in each munition utilizing the determined navigational drift for each respective munition in the munition constellation.

2. The method for constraining navigational drift in a munition as recited in claim 1, wherein an Extended Kalman Filter (EKF) is utilized by each navigation system of each munition for determining an estimated position and covariance of the estimated position for each respective munition in the munition constellation.

3. The method for constraining navigational drift in a munition as recited in claim 1, wherein an Unscented Kalman Filter (UKF) is utilized by each navigation system of each munition for determining an estimated position and covariance of the estimated position for each respective munition in the munition constellation.

4. The method for constraining navigational drift in a munition as recited in claim 1, wherein Two-Way Timing and Ranging (TWTR) techniques are utilized by the navigation system of each munition to determine positioning of each munition relative to one another.

5. The method for constraining navigational drift in a munition as recited in claim 1, wherein determining a relative position of each munition relative to the other munitions in the constellation via each munitions' datalink communication system further includes synchronizing an internal clock of each munition relative to at least one other munition in the munition constellation.

6. The method for constraining navigational drift in a munition as recited in claim 1, wherein the estimated position and range is shared with each of the plurality of munitions in the munition constellation.

7. The method for constraining navigational drift in a munition as recited in claim 6, wherein determining navigational drift for each munition via each munitions' navigation system utilizes the estimated position of each of the plurality of munitions and the range to each of the plurality of munitions in the munition constellation.

8. The method for constraining navigational drift in a munition as recited in claim 6, wherein each munition in the munition constellation includes a seeker component for recognizing a ground target.

9. The method for constraining navigational drift in a munition as recited in claim 1, wherein each munition in the munition constellation is preloaded with a flight plan to a predetermined target seeker basket.

10. The method for constraining navigational drift in a munition as recited in claim 1, wherein each munition in the munition constellation is selected from the group consisting of: gun launched munitions; rocket propelled munitions; motor propelled munitions; air dropped munitions and Unmanned Aerial Vehicles.

11. A system for constraining navigational drift in a munition caused by Inertial Measurement Unit (IMU) bias error during flight of the munition in a constellation of a plurality of munitions in a Global Positioning System (GPS) denied attack of a plurality of ground targets, comprising:
    a datalink communication system configured and operable to communicate with other munitions;
    a navigation system for navigating the munition in flight, wherein the navigation system is communicatively coupled to the datalink communication system, the navigation system having a memory configured to store instructions in a processor disposed in communication with the memory, wherein the processor upon execution of the instructions is configured to:
       determine an estimated position and covariance of the estimated position of the munition via the guidance system;
       determine a range of the munition relative to at least one other munition in the munition constellation via the datalink communication system;
       share the estimated position and range with the at least one other munition in the munition constellation by the datalink communication system;
       determine navigational drift by the guidance system utilizing the estimated position of at least one other munition and the range to that at least one other munition in the munition constellation; and
       constrain navigation drift of the munition by compensating for IMU bias error utilizing the determined navigational drift for the munition.

12. The system for constraining navigational drift as recited in claim 11, wherein either an Extended Kalman Filter (EKF) or Unscented Kalman Filter (UKF) is utilized for determining an estimated position and covariance of the estimated position for each respective munition in the munition constellation.

13. The system for constraining navigational drift as recited in claim 11, wherein Two-Way Timing and Ranging (TWTR) techniques are utilized by the navigation system to determine positioning of the munition relative to at least one other munition in the munition constellation.

14. The system for constraining navigational drift as recited in claim 11, wherein determining a relative position relative to at least one other munition in the munition constellation further includes synchronizing an internal clock of each munition navigation system relative to at least one other munition in the munition constellation.

15. The system for constraining navigational drift as recited in claim 11, wherein the estimated position and range is shared with each of the plurality of munitions in the munition constellation.

16. The system for constraining navigational drift as recited in claim 15, wherein determining navigational drift for the munition utilizes the estimated position of each of the plurality of munitions and the range to each of the plurality of munitions in the munition constellation.

17. The system for constraining navigational drift as recited in claim 11, wherein the munition further includes a seeker component for recognizing a ground target, wherein the seeker component is communicatively coupled to the guidance system.

18. The system for constraining navigational drift as recited in claim 11, wherein each munition in the munition constellation is preloaded with a flight plan to a predetermined target seeker basket.

19. The system for constraining navigational drift as recited in claim 11, wherein the munition is selected from the group consisting of: gun launched munitions; rocket propelled munitions; motor propelled munitions; air dropped munitions and Unmanned Aerial Vehicles.

20. A method for constraining navigational drift in a munition caused by Inertial Measurement Unit (IMU) bias error during flight of the munition in a constellation of a plurality of munitions in a Global Positioning System (GPS) denied attack of a plurality of ground targets wherein each munition is provided with a datalink communication system to communicate with other munitions in the constellation and a navigation system having an IMU for guiding the munition in flight, the method comprising:
  determining an estimated position and covariance of the estimated position in each munition in the munition constellation via each munitions' navigation system utilizing an Extended Kalman Filter (EKF);
  determining a range of each munition relative to at least one other munition in the munition constellation via each munitions' datalink communication system utilizing a Two-Way Timing and Ranging (TWTR) technique;
  sharing the estimated position and range to at least one other munition in the munition constellation by each munition via each munitions' datalink communication system;
  determining navigational drift for each munition via each munitions' navigation system utilizing the estimated position of at least one other munition and the range to that at least one other munition in the munition constellation; and
  constraining navigation drift in each munition by compensating for IMU bias error in each munition utilizing the determined navigational drift for each respective munition in the munition constellation.

* * * * *

UNITED STATES PATENT AND TRADEMARK OFFICE
CERTIFICATE OF CORRECTION

| | | |
|---|---|---|
| PATENT NO. | : 11,913,757 B2 | Page 1 of 1 |
| APPLICATION NO. | : 17/578006 | |
| DATED | : February 27, 2024 | |
| INVENTOR(S) | : Squillace et al. | |

It is certified that error appears in the above-identified patent and that said Letters Patent is hereby corrected as shown below:

In the Specification

In Column 1, Line 51, after "basket", insert --30,--

Signed and Sealed this
Tenth Day of December, 2024

*Katherine Kelly Vidal*

Katherine Kelly Vidal
*Director of the United States Patent and Trademark Office*